Figure 1:
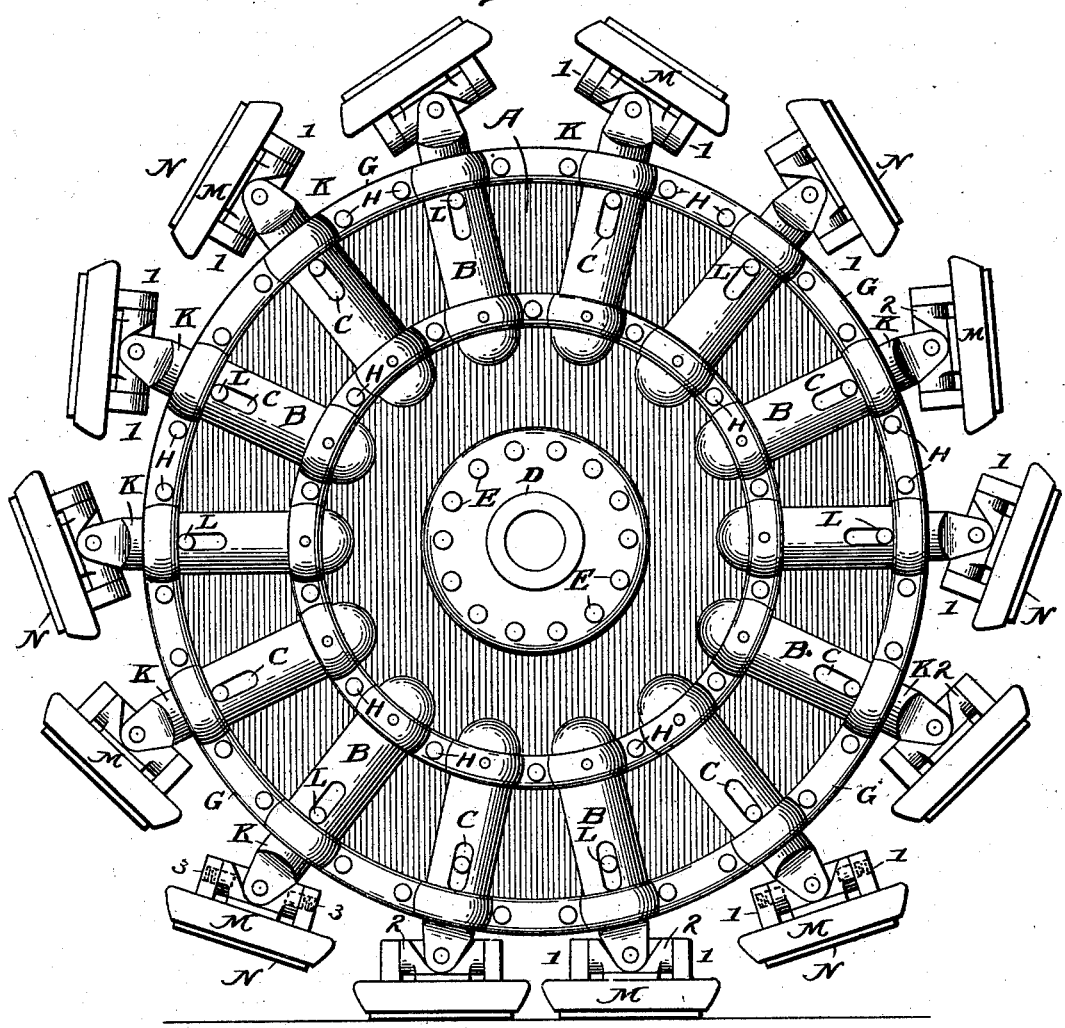

No. 647,245. Patented Apr. 10, 1900.
J. C. ANDERSON.
TRACTION WHEEL.
(Application filed Aug. 16, 1899.)
(No Model.) 3 Sheets—Sheet 1.

WITNESSES:
Vivian Bradford
Wallace Murdock

INVENTOR
Jas. C. Anderson
BY
Wm Crew McIntire
ATTORNEY

No. 647,245. Patented Apr. 10, 1900.
J. C. ANDERSON.
TRACTION WHEEL.
(Application filed Aug. 16, 1899.)
(No Model.) 3 Sheets—Sheet 2.
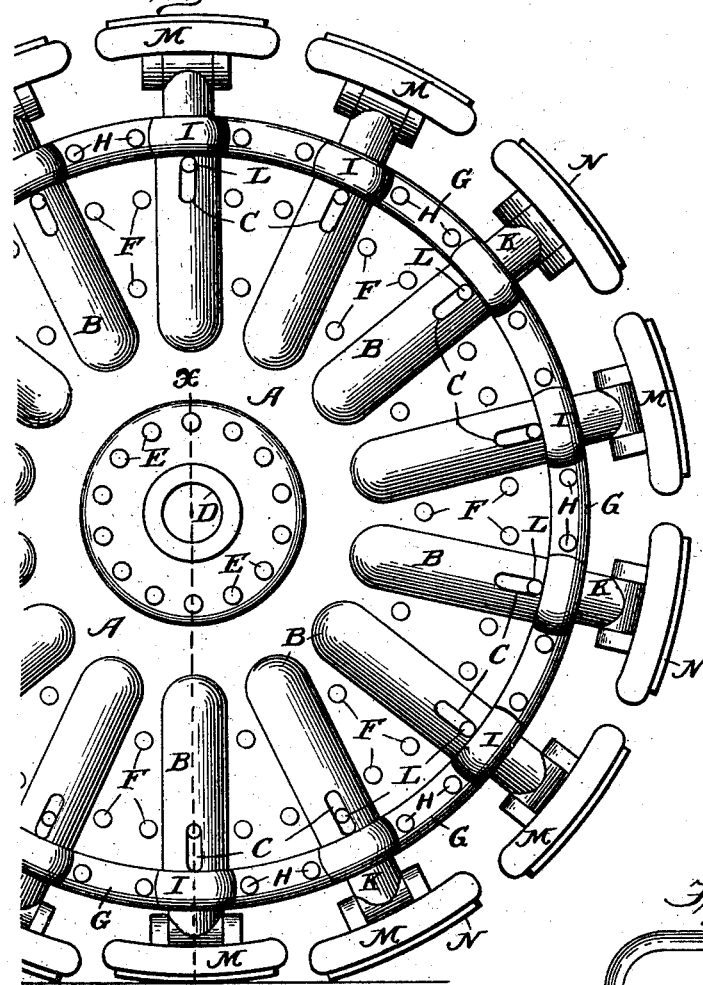
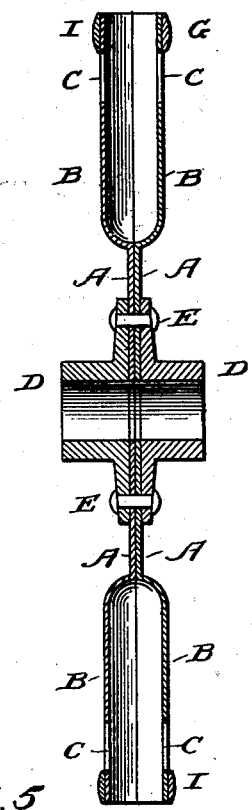
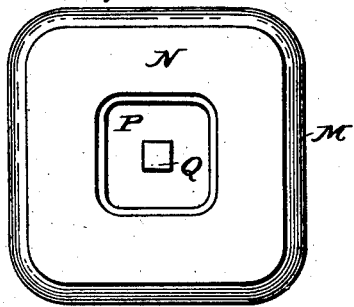
WITNESSES:
INVENTOR
Jas. C. Anderson
BY
ATTORNEY No. 647,245. Patented Apr. 10, 1900.
J. C. ANDERSON.
TRACTION WHEEL.
(Application filed Aug. 16, 1899.)
(No Model.) 3 Sheets—Sheet 3.
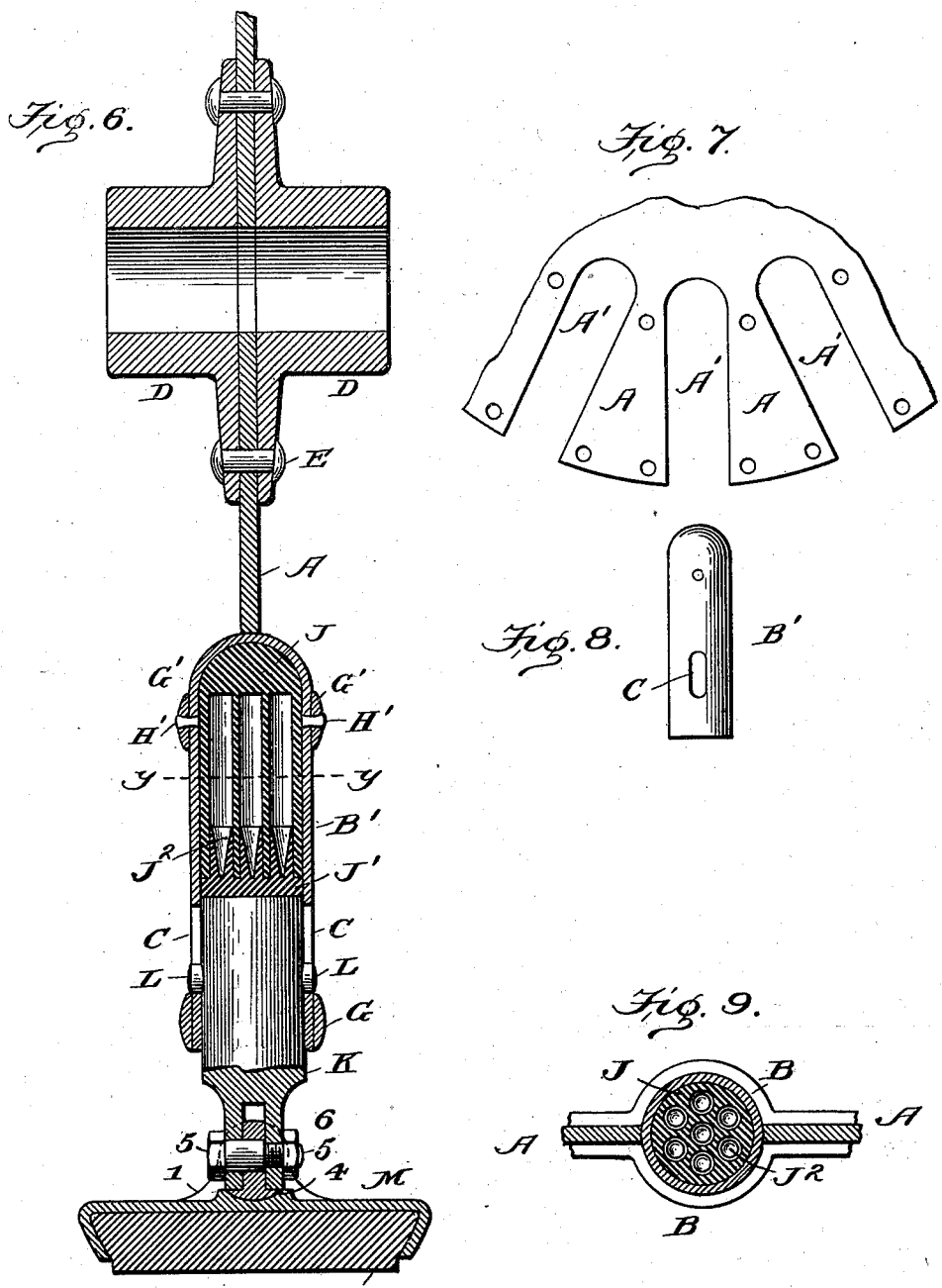

UNITED STATES PATENT OFFICE.

JAMES C. ANDERSON, OF HIGHLAND PARK, ILLINOIS.

TRACTION-WHEEL.

SPECIFICATION forming part of Letters Patent No. 647,245, dated April 10, 1900.

Application filed August 16, 1899. Serial No. 727,460. (No model.)

*To all whom it may concern:*

Be it known that I, JAMES C. ANDERSON, a citizen of the United States, residing at Highland Park, in the county of Lake and State of Illinois, have invented certain new and useful Improvements in Traction-Wheels; and I do hereby declare the following to be a full, clear, and exact description of the invention, such as will enable others skilled in the art to which it appertains to make and use the same.

My invention relates to certain new and useful improvements in wheels for use upon vehicles propelled on roadways by mechanical power, and particularly to that class known as "autotrucks," which are designed for carrying heavy loads.

In the use of wheels upon vehicles propelled by animal motive force it is well understood that the area of traction is the tangential contact between the periphery of the tire multiplied by its width, and the tangential contact is governed entirely by the physical character of the material of which the tire is composed. This contact is of course lessened when the profile or inequalities of the roadbed transverse to the path of the wheel are such that only a portion of the width of the tire comes in contact with the road.

In a vehicle drawn by animal motive force the traction area of the wheel is of comparatively little moment, because the anatomical movements of the animal compensate for the small degree of traction in the vehicle. In other words, in such cases the wheel constitutes a lever to which the physical power of the draft-animal is applied, and nature, recognizing these conditions, has so constructed the hoofs of draft-animals that in contact with a roadway a comparatively-large area of traction is secured. For instance, this traction area with the hoof of an ordinary horse is about thirty square inches, while in a tire, say, two inches wide and composed of resilient material, such as rubber, and assuming that the tire flattens to half an inch, the total area of traction would be but one inch. The articulative joints also of the legs of the animal are such that the hoofs accommodate themselves to the uneven surface of the road to maintain the necessary area of contact, and such contact is preserved in the case of each hoof until the animal has moved forward a distance equal to one step or stride, and hence the push on the traction area is maintained to a similar extent, and thus it is that with this large amount of traction and the toggle action of the legs of a horse he is enabled to draw a heavy load. It has been the recognition of this principle in the application of the physical force of an animal that in the construction of autotruck-wheels they have been devised with excessively wide and resilient tires in order to secure as much traction as possible; but the limit in the width of tires of this kind is such, owing to their weight and cost, that a sufficient amount of traction cannot be secured for the best results.

With knowledge of all of the facts recited my invention has for its object to so construct a wheel that I am enabled to apply to the same all of the traction effects described as relating to draft-animals and so that the application of motive force to the wheels of a vehicle may produce the best results.

With these ends in view my invention consists in the details of construction and arrangement hereinafter more fully described.

In order that those skilled in the art to which my invention appertains may know how to make my improved wheel and thoroughly understand all of its advantages, I will describe the same, referring by letters and numerals to the accompanying drawings, in which—

Figure 1 is a side elevation of one of my improved wheels. Fig. 2 is an incomplete side elevation of the same, showing a modification of the web contact or traction pads, which for the purposes of this specification I will designate "peripheral feet," and a modified form of connection with the ankles. Fig. 3 is a diametric cross-section of the modified construction of wheel shown at Fig. 2. Fig. 4 is a detail view showing one of the peripheral feet in section on a plane transverse to that shown in Fig. 2. Fig. 5 is a plan view of the under side of one of the peripheral feet shown at Fig. 2. Fig. 6 is a radial section, on an enlarged scale, of a wheel such as is shown at Fig. 1. Fig. 7 is a detail plan view showing a portion of the web of the wheel shown at Fig. 1. Fig. 8 is a plan view of the socket for supporting the peripheral feet and adapted for use with the construction of web shown at Fig. 7, and Fig. 9 is a cross-section taken on the line $y\,y$ of Fig. 6.

Similar letters and numerals of reference denote like parts in the several figures.

A A in Figs. 2 and 3 represent two sheet-steel disks formed with a central opening for the passage of a supporting-axle and formed near the periphery with radial half sockets or housings B, each provided with slots C. A hub composed of twin sections D embraces and confines the two disks A and are secured in place by a circumferential row of rivets or screw-bolts E. The disks A are also riveted or bolted together between the housings B, as shown at F, and also at the periphery, through a flat steel ring G, by rivets or bolts H. The ring G is formed with a series of saddles I to ride the housings B. Within the radial housings B is arranged a pneumatic spring J, (see Fig. 6,) having the characteristics described in a pending application filed by me for improvement in automobile carriages on the 16th day of September, 1899, Serial No. 730,688. This spring consists of a rubber body with longitudinal air-cells, in which is confined and sealed liquid air or equivalent, the closure or seal in the present case being of peculiar form, presently explained.

K K, &c., are what I denominate "ankles," composed of steel and cylindrical in cross-section and of a diameter to fit within the housings B and to abut against the flat end or foot of the pneumatic spring J, as best shown at Fig. 6. These ankles are adapted to reciprocate and are held in place by diametric bolts or pins L, the opposite ends of which traverse the slots C in the housings and limit their reciprocating movement in an obvious manner.

The ankle-joints shown at Figs. 1 and 6 articulate in two directions at right angles to each other and are constructed as follows: 1 1 are lugs formed with and projecting from the upper surface of the peripheral feet and adapted to receive a short shaft 2, the opposite ends of which are pivoted between the lugs 1 by pivot-bolts 3. (Shown in dotted lines at Fig. 1.) This shaft 2 is formed on the under side with a curved projection 4, (see Fig. 6,) adapted to articulate in a similarly-curved socket in the reinforced center of the metal foot. The body of the shaft 2 is flattened at the center for a suitable distance, as shown at Fig. 1, to enter the bifurcated extremity of the ankle K, (see Fig. 6,) wherein it is pivoted by a screw-bolt 5, one end of which is reduced and threaded to enter the female thread in one of the bifurcations of the ankle and, extending through the same, is secured against rotation by a jam-nut 6. From this construction it will be seen that the feet M are free to articulate in the direction of the path of the wheel on the pivot-bolt 5 and in a direction transverse thereto upon the pivots 3. (Shown in dotted lines at Fig. 1.)

In the construction shown at Figs. 2, 4, and 5, where I employ a ring-shaped pneumatic cushion or frog, the longitudinal articulation of the ankle is not absolutely necessary, as its absence is compensated for by the yielding of the cushion or frog, and I therefore connect the ankle of the foot by bolts 3 3, which provide for lateral articulation, and I make the tread-line of the shoe and its contained frog on a curve concentric with the periphery of a wheel, as clearly shown in Fig. 2, because as the toe of the foot and its contained frog contact with the ground the pneumatic character of the frog will permit it to flatten longitudinally to a sufficient degree to secure the traction-contact, and the curved face of the shoe and frog permits the heel and toe to leave the surface of the roadway readily and in an obvious manner.

The lateral articulation of the ankle-joint is especially important in both constructions described, for the reason that if such movement were not provided for only a portion of the foot in its lateral direction would contact with the road if the latter should have a profile out of a level line, and the traction-surface would therefore be reduced in exact proportion to the extent of the lateral separation between the foot and road-bed in a like manner as the traction of an ordinary wheel is reduced under similar conditions by reason of such wheel being unable to "wabble," as it were, on its axle. With the provision made in my improved construction it will be seen that my peripheral feet are adapted to the same movement which has been by nature provided for the feet of draft-animals.

In the use of the pneumatic ring-shaped frog shown at Fig. 4 I provide against the lumpy or choppy irregularities of a road-bed, as it will be seen that the hollow or cavity at the center of the frog, coupled with its pneumatic action, permits the foot to bridge any small lump or projection in the road in substantially the same way that the hoof and frog of a draft-animal are designed to do. That nature anticipates this necessity is found in the construction of the feet of draft-animals. The horse has the unyielding hoof and a yielding frog, the formation of the latter being such that a hollow or recess exists on the under side of the foot and within the vertical plane of the hoof, and in the case of cloven-foot animals the foot is divided longitudinally with transverse pivotal action.

The ankles K having reciprocating movement against the springs J provide for a pushing movement of the feet analogous to the muscular and toggle action of the leg of a draft-animal, so that it will be seen that, as hereinbefore stated, I have so constructed my wheel as to invest it when rotary motion is applied through mechanical power with the same physical movements and power as that exerted by an animal. In other words, an automobile or autotruck being known as a "horseless carriage," I have endeavored to compensate for the absence of physical action of the horse.

Recurring to the construction and operation of the frog N, I desire it to be understood that while I have shown frogs which I deem peculiarly adapted for the purposes stated I do not wish to be limited in this respect and that a frog of any other construction or material which will in whole or part subserve the general purpose may be employed, the gist of my invention residing in the fact that I give to the peripheral feet substantially the movement and power that exist in the feet of draft-animals.

M represents what I have denominated "peripheral feet," secured through the pivotal connections just described to the ankles K. They are of rectangular design, as shown, and hollow, with the walls turned inwardly, as shown at Figs. 4 and 6, to embrace and hold what I term "frogs" N, composed of rubber or similar resilient or tractive material, as shown in Figs. 4, 5, and 6, and which project beyond the feet M. In Fig. 6 this frog is shown as solid, while in Figs. 4 and 5 they are shown as embodying an inflated chamber O and made in ring form and held within the walls of the feet by a clamp-ring P, secured in position by a screw-bolt Q. The construction shown at Fig. 6 is adapted for use where the ankle connection with the feet M is such as shown at Figs. 1 and 6, which articulates in two directions at right angles to each other; but where the ankle connection is such as shown at Figs. 2 and 4 the pneumatic frog is employed to compensate for the absence of the articulation in the direction of the path of the wheel.

The spring J, hereinbefore referred to as embodying the general characteristics of the spring described in another pending application, is provided with a foot J', having projecting inwardly-tapered nipples $J^2$, fitting closely within the air-chambers of the spring within which they are cemented. After they have been cemented in position and the inflatable and confined agent is expanded its expansive force, acting within the tapered longitudinal recess of the nipples $J^2$, tends to hold the walls of said nipples tightly against the interior walls of the air-spaces within the body of the spring, and thus acts as auxiliary to the cement.

As already described with reference to Figs. 2 and 3, the housings B are formed integral with the two disks A A; but in the construction shown in Figs. 1, 6, 7, and 8 a single disk A, of heavier gage metal, is confined between the twin hubs and the periphery of the disk as intersected with radial openings A', adapted to receive independent tubular housings B', (shown at Fig. 8,) and when this construction is employed a secondary ring G', similar to the ring G, is secured in place by rivets or metal screws H', passing in the housings B', and thus holding them against outward radial movement, and also by rivets or bolts H intermediate of the saddles.

When the peripheral feet M are designed to articulate only in the direction transverse to the path of the wheel, they, as well as the contained frogs, are curved longitudinally to coincide with the periphery of the disks or webs, as clearly shown at Fig. 2.

Having fully described my invention, what I claim as new, and desire to secure by Letters Patent, is—

1. A wheel for autotrucks and similar vehicles, composed of a central hub, a circumferential web secured thereto, a series of radial housings formed or secured within the periphery of the web, springs located within the housings, reciprocating ankles or plungers within the housings bearing against the springs and held in position independently of each other, peripheral feet articulatively connected to the outer ends of the ankles or plungers, operative independently of each other and provided with suitable traction-surfaces, substantially as and for the purpose hereinbefore set forth.

2. A wheel for automobiles and similar vehicles, composed of a central hub, a circumferential web secured thereto a series of radial housings formed or secured within the periphery of the web, springs located within the housings, reciprocating ankles within the housings, bearing against the springs and held in place independently of each other, and peripheral feet articulatively connected with the ankles and having faces curved concentrically with the periphery of the web and provided with traction pads or frogs, substantially as hereinbefore set forth.

3. In a wheel for automobiles and similar vehicles, two sheet-metal disks secured between twin sections of a hub, half-housings formed radially in the peripheries of each disk, bolts or rivets at suitable localities confining the disks together and a peripheral ring formed with saddles to ride over the housings, and secured in place by bolts or rivets, the housings adapted to receive springs and reciprocating plungers or ankles armed with articulative peripheral feet, substantially as and for the purpose set forth.

4. In a wheel constructed as described and provided with radial housings and reciprocating spring-supported ankles or plungers, peripheral feet pivoted longitudinally to a shaft and the latter pivoted transversely to the outer ends of the ankles or plungers, substantially as and for the purposes set forth.

5. The feet M articulatively connected with the ankles and provided with frogs N adapted to conform to the traction-surface substantially as and for the purpose set forth.

6. In combination with the sheet-metal disk A formed with radial openings A', independently tubular housings B' within the openings A' and secured in place by rings G and G', substantially as shown and described.

7. The ankles K, bifurcated at their outer end and embracing the flattened portion of the shaft 2, and pivoted thereto, in combination with the shaft 2, pivotally connected to the lugs 1, of the feet M, and formed with the curved projection 4 working in a recess in the upper central portion of the foot, substantially as and for the purpose set forth.

8. The ankles K bifurcated at their outer ends and embracing the shafts 2 pivotally connected with the feet M, and the said ankles K, pivoted to the shafts 2 by bolt 5, reduced and threaded at its end and head against rotation by jam-nut 6, substantially as and for the purpose set forth.

9. In combination with the peripheral feet M formed as described and ring-shaped frogs N located within the walls of the feet, clamping-rings P and screw-bolts Q, substantially as and for the purpose set forth.

10. The spring J formed with longitudinal air-cells closed by a head J' having nipples formed with cone-shaped recesses $J^2$, and cemented in place, substantially as described.

In testimony whereof I affix my signature in presence of two witnesses.

JAMES C. ANDERSON.

Witnesses:
F. W. BROOKS,
VIVIAN BRADFORD.